(12) United States Patent
Rabasco et al.

(10) Patent No.: US 8,907,008 B2
(45) Date of Patent: Dec. 9, 2014

(54) RHEOLOGY MODIFIER

(71) Applicant: Rohm and Haas Company, Philadelphia, PA (US)

(72) Inventors: John Rabasco, Allentown, PA (US); Barrett R. Bobsein, Sellersville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/017,893

(22) Filed: Sep. 4, 2013

(65) Prior Publication Data

US 2014/0011967 A1 Jan. 9, 2014

Related U.S. Application Data

(62) Division of application No. 13/274,429, filed on Oct. 17, 2011, now abandoned.

(60) Provisional application No. 61/489,906, filed on May 25, 2011, provisional application No. 61/455,707, filed on Oct. 25, 2010.

(51) Int. Cl.

| | |
|---|---|
| *C08G 18/10* | (2006.01) |
| *C08G 18/78* | (2006.01) |
| *C08G 18/28* | (2006.01) |
| *C08G 18/72* | (2006.01) |
| *C08G 18/48* | (2006.01) |
| *C08G 18/79* | (2006.01) |
| *C09D 7/00* | (2006.01) |
| *C08G 18/83* | (2006.01) |
| *C08L 75/08* | (2006.01) |

(52) U.S. Cl.
CPC ........ *C08G 18/7843* (2013.01); *C08G 18/2825* (2013.01); *C08G 18/725* (2013.01); *C08G 18/10* (2013.01); *C08G 18/4833* (2013.01); *C08G 18/792* (2013.01); *C09D 7/002* (2013.01); *C08G 18/831* (2013.01); *C08L 75/08* (2013.01)
USPC ........... 524/591; 524/589; 524/590; 524/839; 524/840; 524/507; 528/76; 528/85

(58) Field of Classification Search
CPC ........... C08G 18/2825; C08G 18/4833; C08G 18/725; C08G 18/7843
USPC .......... 524/589, 590, 591, 839, 872, 873, 875
See application file for complete search history.

(56) References Cited

U.S. PATENT DOCUMENTS

| | | | |
|---|---|---|---|
| 4,079,028 A | 3/1978 | Emmons et al. | |
| 4,155,892 A | 5/1979 | Emmons et al. | |
| 4,180,491 A * | 12/1979 | Kim et al. ..................... | 524/317 |

(Continued)

FOREIGN PATENT DOCUMENTS

| | | |
|---|---|---|
| EP | 0537900 A2 | 4/1993 |
| EP | 1338615 A2 | 8/2003 |
| EP | 1541643 A1 | 6/2005 |

*Primary Examiner* — Michael L Leonard
(74) *Attorney, Agent, or Firm* — Reid S. Willis

(57) ABSTRACT

The present invention relates to a composition comprising a hydrophobically modified alkylene oxide polyurethane characterized by having a $M_w$ of from 50,000 to about 150,000 Daltons and a polydispersity of 2.5 to about 5.0. The present invention further relates to a multi-step process for the preparation of the hydrophobically modified polymer.

9 Claims, 3 Drawing Sheets

(56) References Cited

U.S. PATENT DOCUMENTS

| | | | |
|---|---|---|---|
| 4,327,008 A * | 4/1982 | Schimmel et al. ............ 524/104 |
| 4,499,233 A | 2/1985 | Tetenbaum et al. |
| 5,023,309 A | 6/1991 | Kruse et al. |
| 7,741,402 B2 | 6/2010 | Bobsein et al. |

* cited by examiner

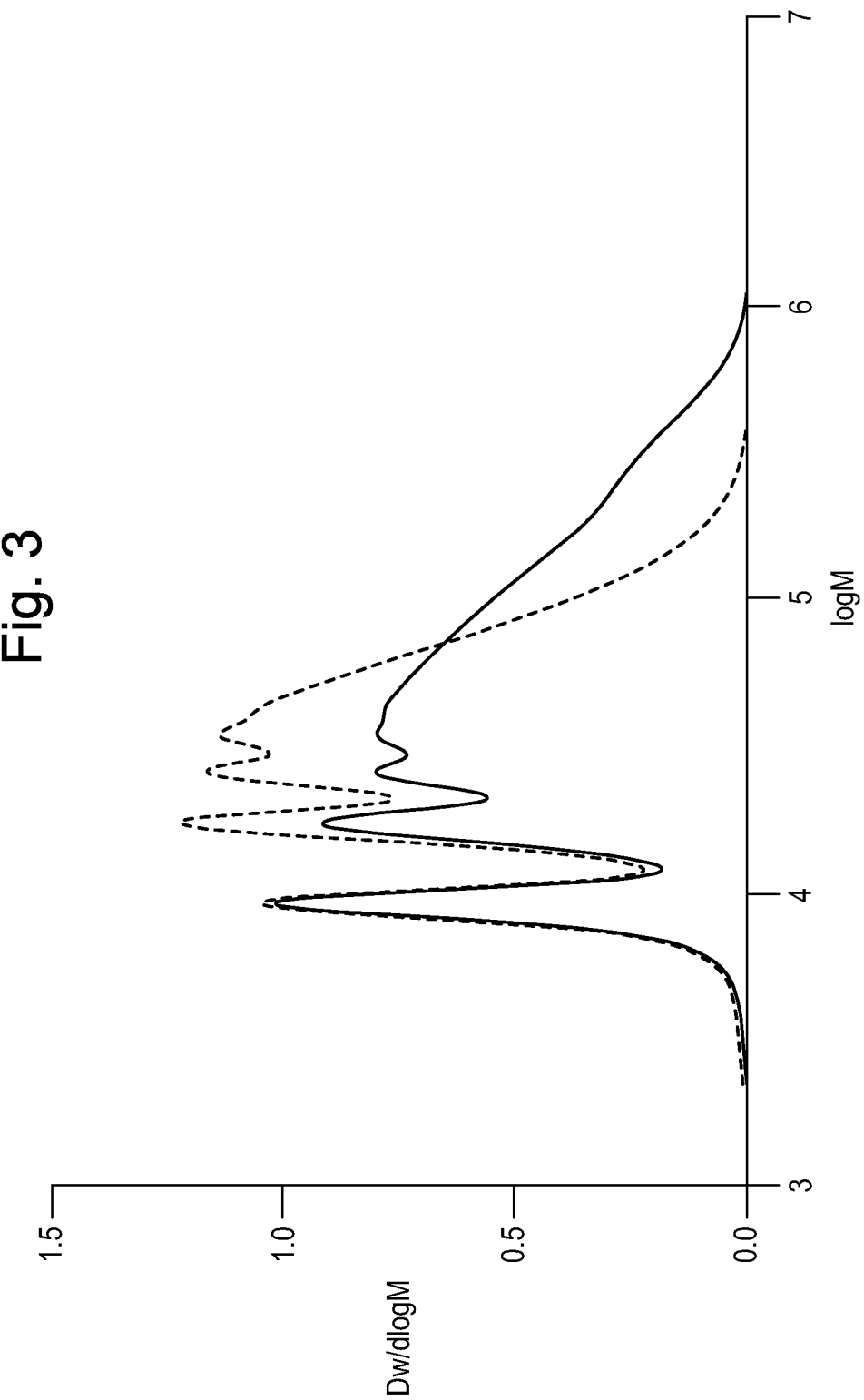

RHEOLOGY MODIFIER

BACKGROUND OF THE INVENTION

The present invention relates to hydrophobic ally modified urethane polymers, which are used as rheology modifiers in waterborne coatings formulations.

Rheology modifiers are used in waterborne coatings formulations to control viscosity over a wide shear rate range. They may be associative (they associate with the dispersed phase) or non-associative (they thicken the water phase). Associative thickeners may be derived from natural products such as hydrophobically modified cellulose ethers, or prepared from synthetic polymers such as hydrophobically modified ethylene oxide urethane (HEUR) polymers. A typical description of HEUR polymers and their preparation can be found in US 2009/0318595 A1, which describes forming a combination of linear and branched HEUR polymers by reacting a polyglycol, a hydrophobic alcohol, a diisocyanate, and a triisocyanate together in a one-pot reaction.

U.S. Pat. No. 4,155,892 (Emmons et al.) describes the preparation of linear as well as branched HEUR polymers in separate examples.

Rheology modifiers are typically classified as either low shear rate viscosity builders (Stormer viscosity builders, also known as KU viscosity builders) or high shear rate viscosity builders (ICI builders). It is desirable to increase ICI viscosity and the efficiency of ICI building rheology modifiers without concomitant increase in KU viscosity because such increase limits the formulator's ability to add a KU building rheology modifier to the formulation.

The commercially available HEUR polymers ACRYSOL™ 5000 and ACRYSOL™ 6000 rheology modifiers (a trademark of The Dow Chemical Company or its affiliates) exhibit ICI viscosities of 1.75 and 2.40 respectively and KU viscosities of 79.3 and 109.7 respectively in an acrylic semi-gloss white paint. It would be advantageous to obtain a hydrophobically modified urethane polymer formulation with an increased ICI/KU viscosity ratio in comparison to these known rheology modifiers.

SUMMARY OF THE INVENTION

In a first aspect, the present invention is a composition comprising a hydrophobically modified alkylene oxide polyurethane characterized by having a $M_w$ of from 50,000 to about 150,000 Daltons and a polydispersity of 2.5 to about 5.0.

In a second aspect, the present invention is a process comprising the steps of:

a) contacting a polyisocyanate branching agent with a stoichiometric excess of a water-soluble polyalkylene glycol under such conditions to form a mixture of the polyalkylene glycol and a branched poly-hydroxyalkylene oxide urethane;

b) contacting the mixture of the polyalkylene glycol and the branched poly-hydroxyalkylene oxide urethane with a difunctional linking agent selected from the group consisting of diisocyanates, epihalohydrins, and gem-dihalides, under such conditions to form a branched urethane polymer containing hydroxyl-reactive end groups; and c) contacting the branched urethane polymer containing hydroxyl-reactive end groups with a capping agent under such conditions to form a hydrophobically modified alkylene oxide urethane, wherein the capping agent is characterized by either of the following formulas:

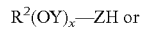

$R^2(OY)_x-ZH$ or

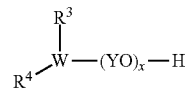

where $R^2$ is a $C_4$-$C_{30}$-alkyl, -aryl, or -aralkyl group; $R^3$ is H or a $C_4$-$C_{30}$-alkyl, -aryl, or -aralkyl group; $R^4$ is a $C_4$-$C_{30}$-alkyl, -aryl, or -aralkyl group; Y is a $C_2$-$C_8$-alkylene group; W is N or P; x is an integer from 0 to 200; and Z is O or NH.

The polymer prepared by the process of the present invention has an improved ICI/KU viscosity balance over a polymer prepared using the same reagents and proportions by a standard 1-pot process.

BRIEF DESCRIPTION OF DRAWINGS

FIG. 3 illustrates an overlay of the molecular weight distributions of the comparative HEUR composition and the HEUR composition of the present invention.

DETAILED DESCRIPTION OF THE INVENTION

Figure 1:
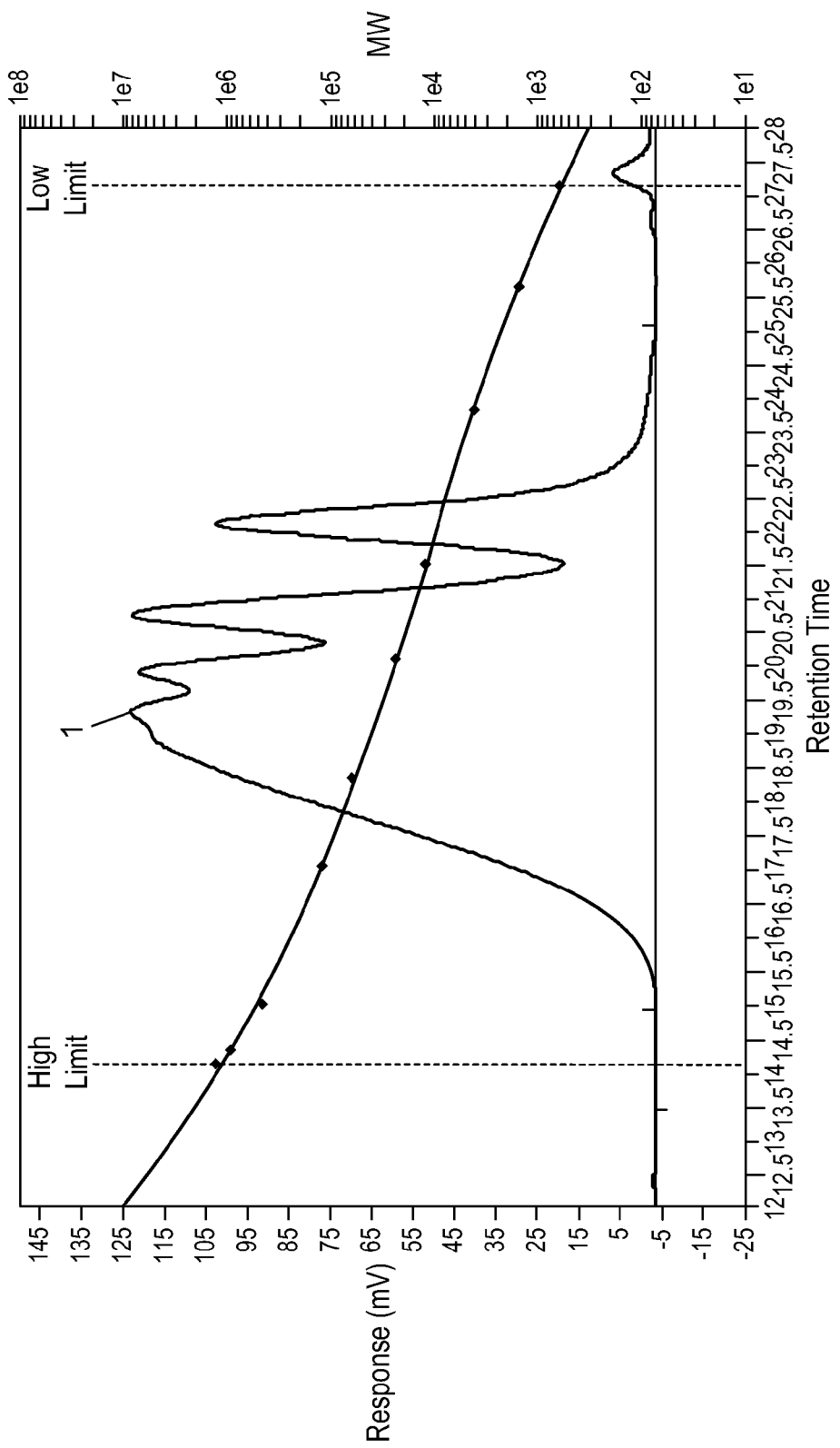
FIG. 1 illustrates a size exclusion chromatographic trace of a comparative HEUR composition.

In a first aspect, the present invention is a composition comprising a hydrophobically modified alkylene oxide polyurethane characterized by having a $M_w$ of from 50,000 to about 150,000 Daltons and a polydispersity of 2.5 to about 5.0.

The hydrophobically modified alkylene oxide polyurethane composition of the present invention is characterized, in part, by hydrophilic polyalkylene oxide groups, examples of which include hydrophilic polyethylene oxide, hydrophilic polyethylene oxide/polypropylene oxide copolymers, and hydrophilic polyethylene oxide/polybutylene oxide copolymers. A preferred hydrophobically modified alkylene oxide polyurethane is a hydrophobically modified ethylene oxide polyurethane (HEUR).

The hydrophobically modified alkylene oxide polyurethane composition is further characterized by urethane groups that link the polyalkylene oxide groups, preferably polyethylene oxide groups. The composition comprises a mixture of linear and branched polymers.

The hydrophobically modified alkylene oxide polyurethane composition is further characterized by inclusion of pendant hydrophobic capping groups, which are characterized by either of the following formulas:

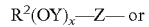

$R^2(OY)_x-Z-$ or

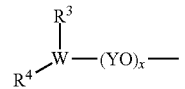

where $R^2$ is a $C_4$-$C_{30}$-alkyl, -aryl, or -aralkyl group; $R^3$ is H or a $C_4$-$C_{30}$-alkyl, -aryl, or -aralkyl group; $R^4$ is a $C_4$-$C_{30}$-alkyl, -aryl, or -aralkyl group; Y a $C_2$-$C_8$ alkylene group; W is N or P; x is an integer from 0 to 200; and Z is O or NH.

In another embodiment, the composition of the present invention has a $M_w$ of from 70,000 to 90,000 Daltons and a polydispersity of 2.9 to about 3.3.

In another embodiment, the composition of the present invention has a $M_w$ of from 110,000 to 140,000 Daltons and a polydispersity of 4.2 to about 4.4.

In a second aspect, the present invention is a process comprising the steps of:

a) contacting a polyisocyanate branching agent with a stoichiometric excess of a water-soluble polyalkylene glycol under such conditions to form a mixture of the polyalkylene glycol and a branched poly-hydroxyalkylene oxide urethane;

b) contacting the mixture of the polyalkylene glycol and the branched poly-hydroxyalkylene oxide urethane with a difunctional linking agent selected from the group consisting of diisocyanates, epihalohydrins, and gem-dihalides, under such conditions to form a branched urethane polymer containing hydroxyl-reactive end groups; and c) contacting the branched urethane polymer containing hydroxyl-reactive end groups with a capping agent under such conditions to form a hydrophobically modified alkylene oxide urethane, wherein the capping agent is characterized by either of the following formulas:

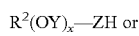

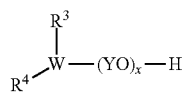

where $R^2$ is a $C_4$-$C_{30}$-alkyl, -aryl, or -aralkyl group; $R^3$ is H or a $C_4$-$C_{30}$-alkyl, -aryl, or -aralkyl group; $R^4$ is a $C_4$-$C_{30}$-alkyl, -aryl, or -aralkyl group; Y a $C_2$-$C_8$ alkylene group; W is N or P; x is an integer from 0 to 200; and Z is O or NH.

In the first step of the process of the present invention, a stoichiometric excess of a water-soluble polyalkylene glycol is contacted with a polyisocyanate branching agent under conditions to form a poly-hydroxyethylene oxide urethane with unreacted polyethylene glycol. A water-soluble polyalkylene glycol refers to water-soluble polyethylene oxides, water-soluble polyethylene oxide/polypropylene oxide copolymers, water-soluble polyethylene oxide/polybutylene oxide copolymers, and polyethylene oxide/polypropylene oxide/polybutylene oxide terpolymers. As used herein, the term propylene oxide refers to either a polymer having —(OCH$_2$CH—$_2$CH$_2$)— and/or —(OCH(CH$_3$)CH$_2$)— repeating groups.

Preferred water-soluble polyalkylene oxides are polyethylene glycols, particularly polyethylene glycols having a weight average molecular weight in the range of from 4000, more preferably from 6000, and most preferably from 7000, to 20,000, more preferably to 12,000 and most preferably to 9000 Daltons.

An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, Mich.).

As used herein the term polyisocyanate branching agent is a compound containing at least three isocyanate groups. Examples of a preferred class of polyisocyanate branching agents include cyanurate trimers and biuret trimers, which are characterized by the following formulas:

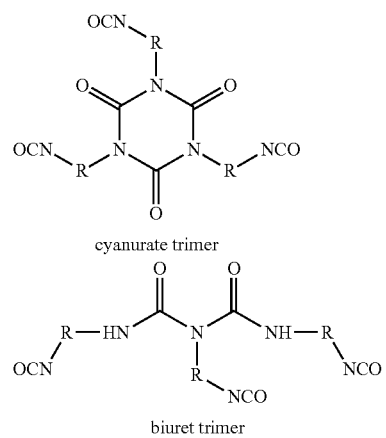

where R is a $C_4$-$C_{30}$-alkylene group, more particularly a $C_4$-$C_{20}$-alkylene group. As used herein, the term "alkylene group" refers to a biradical saturated or partially saturated hydrocarbyl group that is linear-, branched-, or cycloaliphatic or a combination thereof. Specific examples of suitable cyanurate trimers, which are preferred, include HDI isocyanurate (trimer), and IPDI isocyanurate (trimer). The structures of these cyanurate compounds are illustrated:

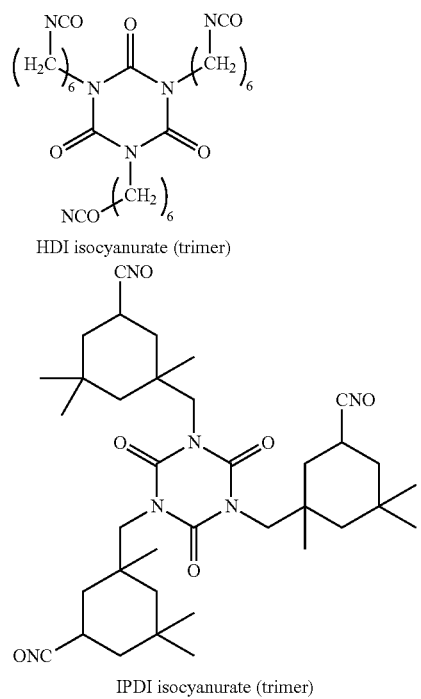

Persons of ordinary skill in the art recognize that isocyanurate trimers generally include lower levels of oligomers (pentamers, heptamers, etc.) that impart higher order isocyanate functionality to the compound. Accordingly, the term "isocyanate trimer" may include the trimer by itself or as a mixture of trimer and other oligomers.

A stoichiometric excess of the polyalkylene glycol is advantageously contacted with the polyisocyanate branching agent in the presence of a catalyst designed to promote the coupling of the hydroxyl and isocyanate groups. Suitable catalysts include tin catalysts such as dibutyltin dilaurate and dibutyltin diacetate. The reaction is carried out under conditions designed to ensure complete or substantially complete consumption of the isocyanate groups. The polyisocyanate branching reagent is conveniently added to a pre-dried mixture of the polyalkylene glycol and optionally a non-interfering solvent with a relatively high boiling point such as toluene.

The mole equivalent:mole equivalent ratio of polyethylene glycol:polyisocyanate branching agent is preferably at least 2:1, more preferably at least 3:1, and most preferably at least 5:1, and preferably not greater than 20:1, more preferably not greater than 10:1.

In a second step, the resultant mixture of the unreacted polyalkylene glycol and the branched poly-hydroxyalkylene oxide urethane is contacted with a difunctional linking agent under conditions sufficient to form a branched urethane polymer containing hydroxyl-reactive end groups, generally at a temperature in the range of 80 to 120° C. and over a period of 1 to 3 hours. As used herein, the term "difunctional linking agent" refers to a $C_4$-$C_{20}$ diisocyanate, an epihalohydrin, or a gem-dihalide, or combinations thereof. Diisocyanates, which are preferred, may be aliphatic or aromatic diisocyanates, or combinations thereof. As used herein, "aliphatic" refers to saturated or partially unsaturated linear-, branched-, or cycloaliphatic, or combinations thereof. Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, isophorone diisocyanate, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate. Preferred diisocyanates include hexamethylene diisocyanate and isophorone diisocyanate.

Epihalohydrins include epichlorohydrin and epibromohydrin; gem-dihalides include gem-dichlorides and gem-dibromides such as dichloromethane, dibromomethane, 1,1-dichloroethane, 1,1-dibromoethane, 1,1-dichlorotoluene, and 1,1-dibromotoluene.

The difunctional linking agent is conveniently added to the pot containing the branched poly-hydroxyalkylene oxide urethane/polyalkylene glycol mixture at sufficient quantities and under conditions to ensure complete or substantially complete conversion of the hydroxyl groups to urethane groups. Thus, a stoichiometric excess of the difunctional linking agent is conveniently used in this step.

The resultant branched urethane polymer containing hydroxyl-reactive end groups is then contacted with a sufficient amount of a capping agent under conditions to ensure substantially complete conversion of isocyanate groups to urethane groups, generally at a temperature in the range of about 70 to 120° C. As used herein, the term "capping agent" refers to a compound of either of the following formulas:

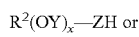
$R^2(OY)_x$—ZH or

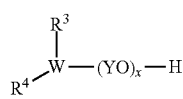

where $R^2$-$R^4$, W, Y, Z, and x are as previously described. Capping agents include linear, branched, or cycloaliphatic alcohols having at least 6 carbon atoms, aromatic alcohols, or aralkyl alcohols, examples of which include as n-hexanol, n-octanol, n-decanol, n-dodecanol, n-hexadecanol, 2-ethyl-1-hexanol, 2-butyl-1-octanol, 2-butyl-1-decanol, 2-hexyl-1-octanol, 2-hexyl-1-decanol, isononyl alcohol, isodecyl alcohol, isoundecyl alcohol, nonyl phenol, cyclohexanol, and benzyl alcohol; akylamines, such as hexylamine, octylamine, and decylamine; and surfactants, such as ethoxylated alkanols, ethoxylated alkylphenols, and polyalkylene glycol monoalkyl ethers.

In another aspect, the capping agent is a $C_8$-$C_{20}$ linear or branched alcohol; in another aspect, the capping agent is a $C_8$-$C_{20}$-alcohol-$C_2$-$C_4$-alkoxylate, preferably a $C_8$-$C_{20}$-alcohol-ethoxylate.

Volatile compounds are advantageously removed by convenient means such as rotary evaporation and the desired polymer is isolated. It has surprisingly been discovered that multi-step approach described herein gives a polymer with superior KU and ICI viscosities as compared to polymers prepared in a single pot reaction.

The coating composition according to the present invention may further include one or more of the following additives: Solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

DETAILED DESCRIPTION OF FIGURES

FIG. 1 illustrates an overlay of the SEC scan of the comparative sample and a 10-point calibration curve generated from narrow molecular weight polyethylene oxide standards. FIG. 1 shows polymers eluting over retention times in the range of about 15 min to about 25 Min. The weight average molecular weight ($M_w$) of this comparator was calculated to be 40,000 Daltons and its polydispersity 1.8.

Figure 2:
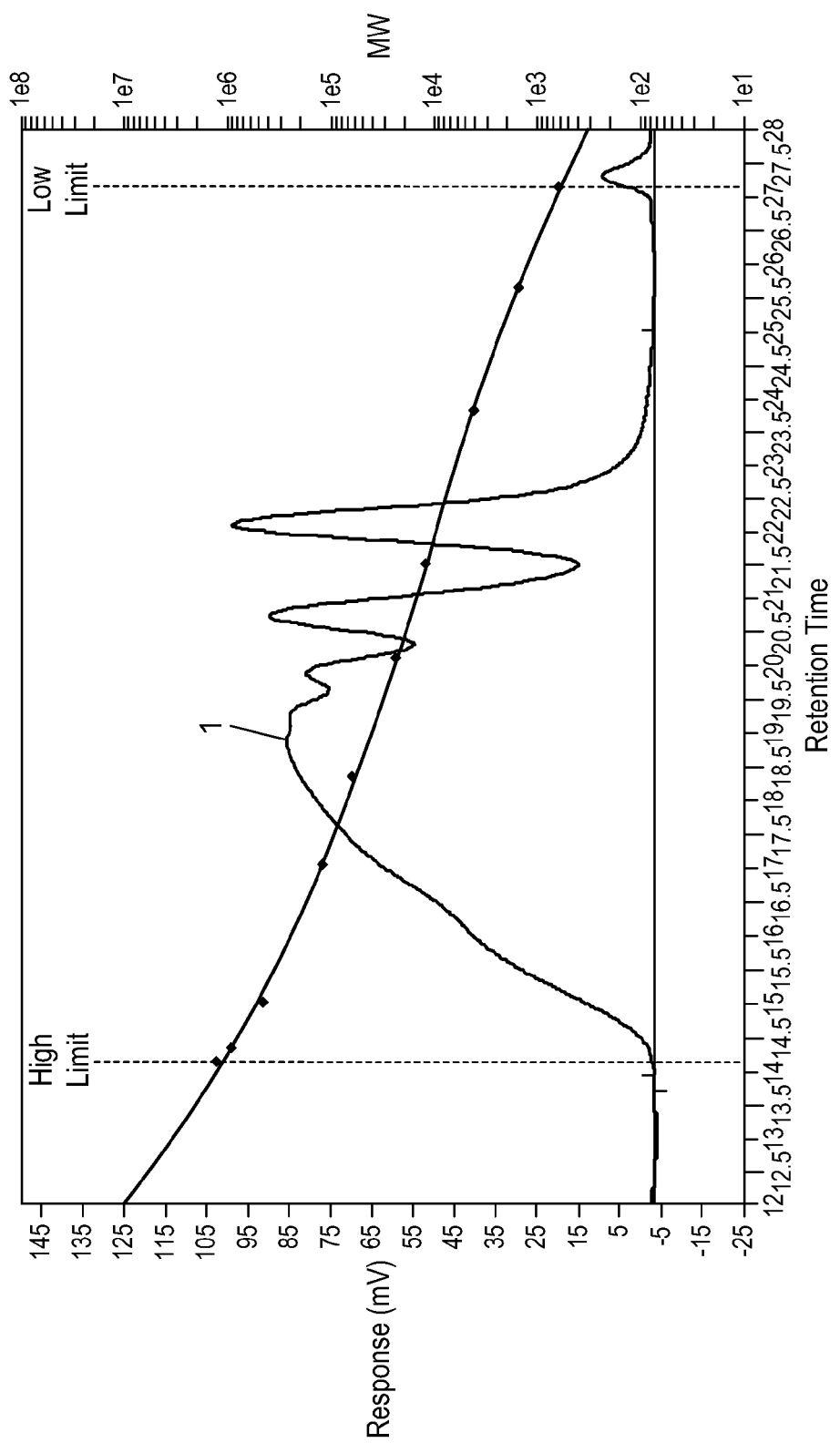
FIG. 2 illustrates a size exclusion chromatographic trace of a HEUR composition of the present invention.

FIG. 2 illustrates an overlay of the SEC for the example of the present invention and a 10-point calibration curve generated from narrow molecular weight polyethylene oxide standards. FIG. 2 shows polymers eluting over retention times in the range of about 14 min to about 25 mM The $M_w$ of the example of the present invention was calculated to be 78,000 Daltons and its polydispersity 3.1.

FIG. 3 illustrates an overlay of molecular weight distribution plots of the comparative sample (dotted plot) and Example 1 (continuous plot), obtained on three Asahipak columns (300×7.5 mm ID), pore size identified as: GF-310HQ, GF-510HQ, GF-710HQ, particle size 9 μm in a mobile phase of 100 mM NH$_4$Ac in MeOH using RI detection.

Description of Thickener Evaluation in Paint

A latex paint composition, Pre-paint #1, was prepared by combining the following components:

| | |
|---|---:|
| Kronos 4311 titanium dioxide slurry | 262.8 g |
| Water | 180.1 g |
| Ethylene glycol | 24.3 g |
| Ropaque Ultra plastic pigment | 49.7 g |
| Rhoplex SG-30 binder | 420.9 g |
| Drewplus L-475 defoamer | 4.0 g |
| Texanol coalescent | 19.2 g |
| Triton X-405 surfactant | 2.5 g |
| Total | 963.5 g |

Kronos 4311 is a product of Kronos Incorporated (Chelmsford, Mass., USA). Drewplus L-475 defoamer is a product of Ashland Specialty Chemical Company. TRITON™ X-405 stabilizer, ROPAQUE™ Ultra opaque polymer and RHOPLEX™ SG-30 emulsion are products of The Dow Chemical Company or its subsidiaries.

The formulated paint was obtained by adding aqueous thickener dispersion and water to Pre-paint #1 (963.5 g). To maintain constant solids of the fully formulated paint, the combined weight of added thickener and water was 49.5 g. The density of the fully formulated paint was 1013 pounds/100 gal (1.2 Kg/l). The pH of the fully formulated paints was in the range of 8.5 to 9.0.

Formulated paints were made by the following method. To 963.5 g Pre-paint #1 were added slowly aqueous thickener dispersion (40.0 g) and water (9.5 g). The mixture was stirred for 10 min. The aqueous thickener dispersions were made by adding dried solid thickener wax (10.0 g), methyl-beta-cyclodextrin (available from Wacker-Chemie Gmbh, Munich, Germany, 1.0 g of a 50% solution) and water (39.0 g) to a 50 mL plastic centrifuge tube. The tubes were capped and mounted on a rotator for continuous tumbling over 48 h until the aqueous thickener dispersions were homogeneous. Following a 24 h equilibration at room temperature, the thickened paint was stirred for 1 min on a lab mixer before measuring viscosity values.

"KU viscosity" is a measure of the mid-shear viscosity as measured by a Krebs viscometer. The Krebs viscometer is a rotating paddle viscometer that is compliant with ASTM-D562. KU viscosity was measured on a Brookfield Krebs Unit Viscometer KU-1+ available from Brookfield Engineering Labs (Middleboro, Mass., USA).

"ICI viscosity" is the viscosity, expressed in units of poise, measured on a high shear rate, cone and plate viscometer known as an ICI viscometer. An ICI viscometer is described in ASTM D4287. It measures the viscosity of a paint at approximately 10,000 sec$^{-1}$. ICI viscosities of paints were measured on a viscometer manufactured by Research Equipment London, Ltd (London, UK). An equivalent ICI viscometer is the Elcometer 2205 manufactured by Elcometer, Incorporated (Rochester Hills, Mich., USA). The ICI viscosity of a paint typically correlates with the amount of drag force experienced during brush application of the paint.

EXAMPLES

The following examples are for illustrative purposes only and not intended to limit the scope of the invention.

Comparative Example 1

A mixture of CARBOWAX™ 8000 Polyethylene Glycol (150 g) and toluene (360 g) were added to a vessel and dried by azeotropic distillation. The mixture was cooled to 90° C. and Desmodur N3600 polyisocyanate (1.36 g) and Desmodur H (4.14 g) were added to the mixture. The mixture was stirred for 5 min, then dibutyltin dilaurate (0.21 g) was added. The mixture was stirred for 1 h, then cooled to 80° C.; n-decanol (3.91 g) was then added and stirring was continued for 1 h. The mixture was cooled to 60° C. and the polymer was then isolated by rotary evaporation. ICI and KU viscosities were found to be 1.90 Poise and 87.0 Krebs units respectively. $M_w$ as measured by SEC was found to be 40,000 with $M_w/M_n$ polydispersity equal to 1.9.

Comparative Example 2

A mixture of CARBOWAX™ 8000 Polyethylene Glycol (150 g) and toluene (360 g) were added to a vessel and dried by azeotropic distillation. The mixture is cooled to 90° C. and Desmodur N3600 polyisocyanate (1.81 g) and Desmodur H (3.94 g) was added to the mixture. The mixture was stirred for 5 minutes, then dibutyltin dilaurate (0.21 g) was added. The mixture was stirred for 1 hour whereupon n-decanol (3.91 g) was then added to the mixture; stirring was continued for an additional 1 hour. The mixture was cooled to 60° C. and the polymer isolated via rotary evaporation. ICI and KU viscosities were found to be 2.10 Poise and 102.1 Krebs Units, respectively. $M_w$ as measured by SEC was found to be 43,000 with $M_w/M_n$ polydispersity equal to 1.9.

Example 1

A of CARBOWAX™ 8000 Polyethylene Glycol (150 g) and toluene (360 g) were added to a vessel and dried by azeotropic distillation. The mixture was cooled to 90° C. and Desmodur N3600 polyisocyanate (1.36 g) was added to the mixture. The mixture was stirred for 5 min, then dibutyltin dilaurate (0.21 g) was added. The mixture was stirred for 1 h, after which time Desmodur H (4.15 g) was added. Stirring was continued for an additional 1 h then cooled to 80° C. n-Decanol (3.91 g) was then added to the mixture and stirring was continued for an additional 1 h. The mixture was cooled to 60° C. and the polymer was isolated by way of rotary evaporation. ICI and KU viscosities were found to be 2.40 Poise and 90.2 Krebs units respectively. $M_w$ as measured by SEC was found to be 79,000 with $M_w/M_n$ polydispersity equal to 3.1.

Although the nature and amounts of the starting materials used to make the polymers of Comparative Example 1 and Example 1 are the same, the ICI/KU viscosity profile is clearly superior for Example 1, the product prepared by the process of the present invention, as evidenced by the higher ICI/KU ratio for the product of the present invention.

Example 2

A mixture of CARBOWAX™ 8000 Polyethylene Glycol (150 g) and toluene (360 g) were added to a vessel and dried by azeotropic distillation. The mixture is cooled to 90° C. and Desmodur N3600 polyisocyanate (1.81 g) was added to the mixture. The mixture was stirred for 5 minutes, then dibutyltin dilaurate (0.21 g) was added. The mixture was stirred for 1 hour, after which time Desmodur H (3.94 g) was added. Stirring was continued for an additional 1 hour then cooled to 80° C. n-Decanol (3.91 g) was then added to the mixture and stirring was continued for an additional 1 hour. The mixture was cooled to 60° C. and the polymer isolated via rotary evaporation. ICI and KU viscosities were found to be 2.80 Poise and 109.1 Krebs Units, respectively. $M_w$ as measured by SEC was found to be 124,000 with $M_w/M_n$, polydispersity equal to 4.4.

Again, the ICI/KU viscosity profile is superior for Example 2 as compared to Comparative Example 2.

Size exclusion chromatography (SEC) was carried out for the above-prepared samples as follows:

a) Sample Preparation:

Samples were prepared in 100 mM NH$_4$Ac in MeOH (Optima grade from Fisher) at concentration of about 2 mg/g. Samples were brought into solution by shaking on the mechanical shaker overnight at ambient temperature. Sample solutions were filtered using 0.45 μm PTFE filters. Samples appeared to be soluble (checked visually) and no resistance was observed during filtration process.

b) SEC set-up and separation conditions:

Separations were carried out on a liquid chromatograph consisting of an Agilent 1100 Model isocratic pump and injector (Waldbronn, Germany) and Waters 2414 Model differential refractometer (Milford, Mass.) operated at 40° C. System control, data acquisition and data processing were performed using Cirrus® software version 3.1 (Polymer Laboratories, Church Stretton, UK).

The calibration curve was generated using polyethylene oxide standards with the following $M_p$s: 615, 1500, 3930, 12140, 23520, 62100, 116300, 442800, 909500 and 1258000. the polydispersities of these standards ranged from about 1.04 to 1.16. The standards were obtained commercially from Polymer Laboratories, part of Agilent, part# PL2080-0201.

SEC separations were performed with a mobile phase of 100 mM NH$_4$Ac in MeOH (Optima grade from Fisher) @ 1 mL/min. The SEC column set used in this study was composed of three Asahipak columns (300×7.5 mm ID) packed with highly cross-linked polar gel. The column pore size was identified as: GF-310HQ, GF-510HQ and GF-710HQ, the particle size was 9 μm and the columns were purchased from Shoko America (Torrance, Calif.).

In characterizing the composition of the present invention it is understood that the ranges used to calculate $M_w$ and polydispersity of the composition are relative to the calibration standards, the columns, and the detector used to analyze and separate components of the composition as described above. Accordingly, as used herein, $M_w$ and polydispersity values and ranges refer to the $M_w$ and polydispersities generated for samples under the SEC conditions described above.

What is claimed is:

1. A process comprising the steps of:
   a) contacting a polyisocyanate branching agent with a stoichiometric excess of a water-soluble polyalkylene glycol under such conditions to form a mixture of the polyalkylene glycol and a branched poly-hydroxyalkylene oxide urethane;
   b) contacting the mixture of the polyalkylene glycol and the branched poly-hydroxyalkylene oxide urethane with a stoichiometric excess of a difunctional linking agent selected from the group consisting of diisocyanates, epihalohydrins, and gem-dihalides, under such conditions to form a branched urethane polymer containing hydroxyl-reactive end groups; and
   c) contacting the branched urethane polymer containing hydroxyl-reactive end groups with a capping agent under such conditions to form a hydrophobically modified alkylene oxide urethane, wherein the capping agent is characterized by either of the following formulas:

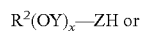

or

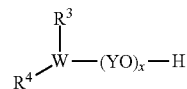

where $R^2$ is a $C_4$-$C_{30}$-alkyl, -aryl, or -aralkyl group; $R^3$ is H or a $C_4$-$C_{30}$-alkyl, -aryl, or -aralkyl group; $R^4$ is a $C_4$-$C_{30}$-alkyl, -aryl, or -aralkyl group; Y is a $C_2$-$C_8$-alkylene group; W is N or P; x is an integer from 0 to 200; and Z is O or NH.

2. The process of claim 1 wherein the polyalkylene glycol is a polyethylene glycol having a weight average molecular weight in the range of 4000 to 20,000 Daltons.

3. The process of claim 1 wherein the polyisocyanate branching agent includes a cyanurate trimer or a biuret trimer, or a combination thereof, which trimers are characterized by the following formulas:

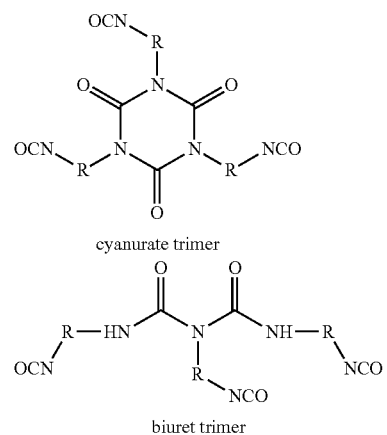

where R is a $C_4$-$C_{30}$-alkylene group.

4. The process of claim 1 wherein the polyisocyanate branching agent includes HDI isocyanurate (trimer) or IPDI isocyanurate (trimer) or a combination thereof and the polyethylene glycol has a weight average molecular weight in the range of 7000 to 9000 Daltons.

5. The process of claim 4 wherein the difunctional linking agent is a $C_4$-$C_{20}$-diisocyanate.

6. The process of claim 5 wherein the capping agent is a $C_8$-$C_{20}$-alcohol.

7. The process of claim 5 wherein the capping agent is a $C_8$-$C_{20}$-alcohol-$C_2$-$C_4$-alkoxylate.

8. A process comprising the steps of:
   a) contacting HDI isocyanurate trimer with a stoichiometric excess of polyethylene glycol having a weight average molecular weight in the range of 7000 to 9000 Daltons under such conditions to form a mixture of the polyethylene glycol and a branched poly-hydroxyethylene oxide urethane;
   b) contacting mixture of the polyethylene glycol and the branched poly-hydroxyethylene oxide urethane with hexamethylene diisocyanate under such conditions to form a branched urethane polymer containing isocyanate end groups; and c) contacting the branched urethane polymer containing isocyanate end groups with a $C_8$-$C_{20}$ alcohol under such conditions to form a hydrophobically modified ethylene oxide urethane.

9. The process of claim 8 wherein the capping agent is n-decanol or 2-butyl-1-octanol.

\* \* \* \* \*